US012643752B2

(12) United States Patent
Arakawa

(10) Patent No.: US 12,643,752 B2
(45) Date of Patent: Jun. 2, 2026

(54) IMAGE FORMING APPARATUS

(71) Applicant: BROTHER KOGYO KABUSHIKI KAISHA, Nagoya (JP)

(72) Inventor: Takashi Arakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 67 days.

(21) Appl. No.: 18/650,547

(22) Filed: Apr. 30, 2024

(65) Prior Publication Data

US 2024/0369959 A1 Nov. 7, 2024

(30) Foreign Application Priority Data

May 1, 2023 (JP) ................................ 2023-075556

(51) Int. Cl.
*B65H 5/06* (2006.01)
*B65H 3/06* (2006.01)
*G03G 15/00* (2006.01)

(52) U.S. Cl.
CPC ............. *B65H 5/06* (2013.01); *B65H 3/0669* (2013.01); *G03G 15/757* (2013.01); *B65H 2402/51* (2013.01); *B65H 2402/52* (2013.01); *B65H 2402/60* (2013.01); *B65H 2403/724* (2013.01); *B65H 2403/73* (2013.01)

(58) Field of Classification Search
CPC ........ B65H 3/0669; B65H 5/06; B65H 5/062; B65H 9/006; B65H 2402/51; B65H 2402/52; B65H 2402/60; B65H 2403/724; B65H 2403/73; B65H 2404/144; G03G 15/757
See application file for complete search history.

(56) References Cited

U.S. PATENT DOCUMENTS 5,432,590 A * 7/1995 Nomura ............ G03G 21/0058 399/167
2007/0235923 A1* 10/2007 Keller .................... B65H 5/062 271/264
2010/0052244 A1* 3/2010 Terao ..................... B65H 5/062 271/125

(Continued)

FOREIGN PATENT DOCUMENTS

JP 2020-109464 A 7/2020
JP 2022-021402 A 2/2022

*Primary Examiner* — Prasad V Gokhale

(74) *Attorney, Agent, or Firm* — Scully, Scott, Murphy & Presser, P.C.

(57) ABSTRACT

An image forming apparatus includes an image forming device, a motor, a driving gear including a first coupling, a first roller, a transmission gear meshed with the driving gear and rotatable integrally with the first roller, a second roller to rotate to convey the sheet toward the image forming device in conjunction with the first roller, an urging member urging the second roller toward the first roller, and a joint shaft connected to the first coupling at one end thereof in an axial direction. The second roller includes a second coupling arranged concentrically with a rotation shaft of the second roller. The second coupling transmits a driving force from the driving gear to the second roller. The second coupling is connected with the other end of the joint shaft in the axial direction. The second coupling in conjunction with the first coupling and the joint shaft form a universal joint.

8 Claims, 9 Drawing Sheets

(56) References Cited

U.S. PATENT DOCUMENTS

| | | | | |
|---|---|---|---|---|
| 2017/0017192 | A1* | 1/2017 | Sakurai | F16D 1/10 |
| 2019/0367302 | A1* | 12/2019 | Inui | B65H 3/0669 |
| 2020/0209781 | A1 | 7/2020 | Noda et al. | |
| 2022/0026842 | A1 | 1/2022 | Yamamoto | |

* cited by examiner

IMAGE FORMING APPARATUS

REFERENCE TO RELATED APPLICATIONS

This application claims priority from Japanese Patent Application No. 2023-075556, filed on May 1, 2023. The entire content of the priority application is incorporated herein by reference.

BACKGROUND ART

A conventional image forming apparatus provided with an image forming device, a motor, a first roller, a second roller, and an urging member, is known.

The image forming apparatus may include a driving gear, a first idle gear, a second idle gear, a first gear, second gear, and a joint shaft.

The driving gear may have a first recess and may be rotated by a driving force from the motor. The driving gear may mesh with the second idle gear. The first gear may mesh with the second idle gear and rotate integrally with the first roller.

The first idle gear may have a second recess. The second recess may be distanced from the first recess in an axial direction of the joint shaft. The joint shaft may be coupled with the first recess at one end and with the second recess at the other end thereof in the axial direction, and the joint shaft with the one end and the other end may form a universal joint.

The joint shaft may transmit the driving force input from the first recess to the second recess regardless of whether a rotation axis of the second recess is at a concentric position or a deviated position with respect to a position of a rotation axis of the first recess. The second gear may mesh with the first idle gear and may rotate integrally with the second roller.

As such, the conventional image forming apparatus may drive the first roller and the second roller to rotate with the driving force of the motor.

SUMMARY

In the conventional image forming apparatus with the first idle gear, the second idle gear, and the first gear, the joint shaft may need to be located at a lower and farther position to a maintenance worker with respect to the second roller in the image forming apparatus.

Therefore, the joint shaft may not be reached by the worker easily for maintenance, and removal of the joint shaft may be difficult to the worker. Without removing the joint shaft, the second roller may not be removed easily, and the maintenance work including the removal of the second roller may be difficult.

The present disclosure relates to an image forming apparatus, from which a joint shaft and a second roller may be removed easily.

According to an aspect of the present disclosure, an image forming apparatus includes an image forming device configured to form an image on a sheet, a motor configured to generate a driving force, a driving gear including a first coupling and rotatable by the driving force from the motor, a first roller configured to convey the sheet toward the image forming device, a transmission gear meshed with the driving gear and rotatable integrally with the first roller, a second roller configured to nip the sheet in conjunction with the first roller and rotate to convey the sheet toward the image forming device, an urging member urging the second roller toward the first roller, and a joint shaft connected to the first coupling at one end thereof in an axial direction. The second roller includes a second coupling arranged concentrically with a rotation shaft of the second roller. The second coupling is configured to transmit the driving force from the driving gear to the second roller. The second coupling is connected with the other end of the joint shaft in the axial direction. The second coupling in conjunction with the first coupling and the joint shaft form a universal joint.

DESCRIPTION

An embodiment of the present disclosure will be described below with reference to the accompanying drawings.

Embodiment

Figure 1:
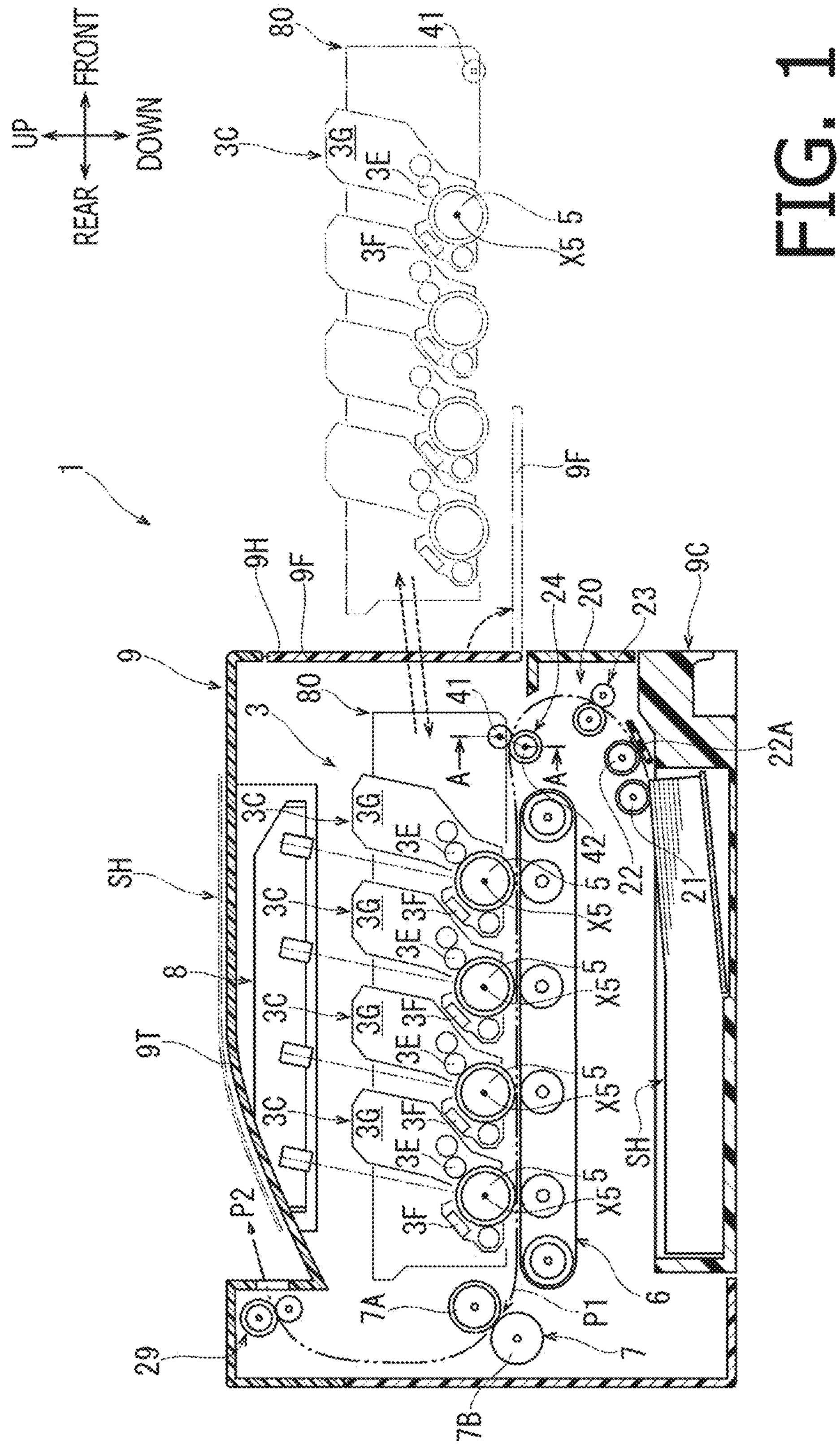
FIG. 1 is a cross-sectional view of an image forming apparatus showing a first position and a third position of a drawer.

An image forming apparatus 1 as shown in FIG. 1 is a multicolor printer capable of forming images electro-photographically on sheets and is an example of the image forming apparatus.

Overall Configuration of Image Forming Apparatus

The image forming apparatus 1 includes a main body 9 in a form of a box, an image forming device 3 housed in the main body 9, a sheet tray 9C, a feeder 30, and an ejection roller pair 29.

The sheet tray 9C is located to be lower than the image forming device 3. The sheet tray 9C may store a stack of sheets SH, on which images may be formed, therein. The sheets SH may be, for example, paper sheets, OHP sheets, etc.

On an upper side of the main body 9, an ejection tray 9T is formed. The ejection tray 9T may support the sheets SH, on which the images are formed.

The main body 9 includes an opening 9H and a front cover 9F. The opening 9H is located at an upper-frontward position in the main body 9. The front cover 9A is pivotable about a pivot axis, which is at a lower end thereof, and closes the opening 9H when in an upright position. The front cover 9F may uncover the opening 9H by tilting so that an upper end thereof may move lower-frontward and lying substantially horizontally.

A widthwise direction of the image forming apparatus 1 intersects orthogonally with a front-rear direction and an up-down direction. A left-hand side to a user or a worker who faces toward the opening 9H and the front cover 9F of the main body 9, i.e., a nearer side in FIG. 1 to a viewer, will be called one side in the widthwise direction. The front-rear direction, the up-down direction, and the widthwise direction indicated by arrows in FIGS. 2-9 correspond to those in FIG. 1. The widthwise direction in the image forming apparatus 1 is parallel to an axial direction of a joint shaft 55, which will be described further below.

As shown in FIG. 1, the feeder 20 is located frontward with respect to the image forming device 3. The feeder 20 includes a feeder roller 21, a separator roller 22, a separator pad 22A, a conveyer roller pair 23, and a registration roller pair 24, which are arranged along a feeding path P1.

The feeding path P1 is a path for the sheets SH to travel upper-frontward from a frontward end of the sheet tray 9C, turn rearward in a shape of U, and proceed rearward substantially horizontally through the image forming device 3.

The feeder roller 21 may feed the sheets SH stored in the sheet tray 9C to the feeding path P1. The separator roller 22 and the separator pad 22A may separate one of the sheets SH from the others when multiple sheets SH are given by the feeder roller 21.

The conveyer roller pair 23 may nip the separated one of the sheets SH and forward to registration roller pair 24.

The registration roller pair 24 is located at a turning point of the U-shaped curve in the feeding path P1. The registration roller pair 24 includes a first roller 41 and a second roller 42. The second roller 42 may nip the sheet SH in conjunction with the first roller 41 and rotate with the sheet SH nipped between the second roller 42 and the first roller 41.

The first roller 41 and the second roller 42 may rotate and stop rotating periodically. While the first roller 41 and the second roller 42 are pausing, the sheet SH being conveyed and reaching the first roller 41 and the second roller 42 may contact the first roller 41 and the second roller 42. After a predetermined length of time from the contact, the first roller 41 and the second roller 42 may start rotating to convey the sheet SH toward the image forming device 3. As such, skewing of the sheet SH may be regulated. The first roller 41 and the second roller 42 will be described further below.

The timing when the first roller 41 and the second roller 42 start rotating may be controlled based on timing when a sheet sensor, which is not shown but is located at a position on the feeding path P1 between the conveyer roller pair 23 and the registration roller pair 24, detects a leading edge of the sheet SH.

The sheet SH fed by the feeder 20 to the image forming device 3 may be conveyed further to travel through the image forming device 3 along a horizontally-extending part of the feeding path P1.

The image forming device 3 in the present embodiment is a direct tandem-typed printer for forming multicolor images electro-photographically. The image forming device 3 includes a drawer 80, a transfer belt 6, a scanner 8, and a fuser 7.

The drawer 80 is in a known structure and is in a form of a frame consisting of a pair of side walls, which extend in the front-rear direction on the nearer side and a farther side in FIG. 1 to the viewer, i.e., the one side and the other side in the widthwise direction, and a plurality of connecting members extending in the widthwise direction and connecting the side walls. A detailed illustration of the drawer 80 in the drawings is omitted.

The main body 9 may accommodate the drawer 80. A position of the drawer 80 illustrated in solid lines in FIG. 1 is a first position, at which the drawer 80 is accommodated in the main body 9 and at which the image forming device 3 is operable to form images.

The drawer 80 includes four photosensitive drums 5 corresponding to toners in four colors, which are black, yellow, magenta, and cyan. Each photosensitive drum 5 is rotatable about an axis X5, which extends in the widthwise direction. The drawer 80 supports the photosensitive drums 5 rotatably. The photosensitive drums 5 are aligned in tandem in the front-rear direction along the horizontally-extending part of the feeding path P1.

Figure 2:
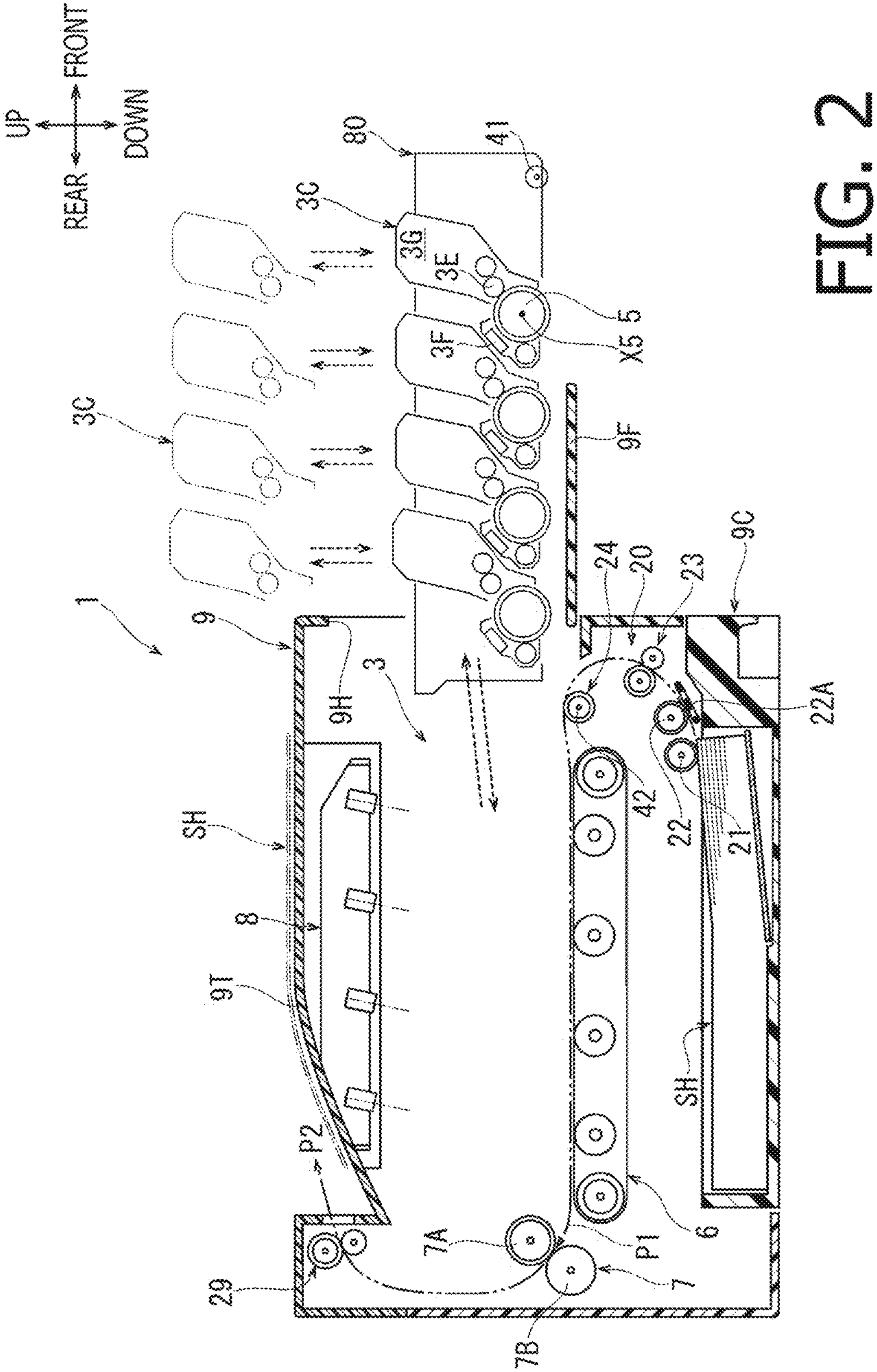
FIG. 2 is a cross-sectional view of the image forming apparatus showing a second position of the drawer.

As shown in FIG. 2, the drawer 80 is loaded with four toner cartridges 3C. As shown in FIG. 1, the toner cartridges 3C are provided in one-to-one correspondence with the photosensitive drums 5 and aligned in tandem in the front-rear direction along the horizontally-extending part of the feeding path P1. The toner cartridges 3C each store the toner in the corresponding color.

Each toner cartridge 3C includes a developing roller 3E, a charger 3F, and a toner container 3G, which are arranged in vicinities of the corresponding one of the photosensitive drums 5.

The main body 9 supports the drawer 80 on guide rails, which are not shown. Along the guide rails, the drawer 80 is movable frontward from the first position.

The drawer 80 is, when the front cover 9F pivots to a position drawn in dash-and-dots lines in FIG. 1 to uncover the opening 9H, movable among the first position as drawn in the solid lines in FIG. 1, a second position as shown in FIG. 2, and a third position as drawn in dash-and-dots lines in FIG. 1.

As shown in FIG. 2, the second position of the drawer 80 is a position, at which the drawer 80 is drawn frontward from the first position, i.e., outward from the main body 9, where the toner cartridges 3C are replaceable with another. The guide rails (not shown) support a rearward part of the drawer 80 at the second position so that the drawer 80 may not fall off frontward from the main body 9. In other words, the drawer 80 located at the second position is not detached from the main body 9 but is coupled to the main body 9.

As shown in FIG. 1, the third position of the drawer 80 is a position, at which the drawer 80 is drawn further frontward from the second position, where the drawer 80 is detached from the main body 9. By detaching the drawer 80 from the main body 9, the user may, for example, remove a jammed sheet SH from the feeding path P1 and replace consumable items not including the toner cartridges 3C.

The transfer belt 6 is located on a side below and opposite to the photosensitive drums 5 across the horizontally-extending part of the feeding path P1. The transfer belt 6 may nip the sheet SH being conveyed in conjunction with the photosensitive drums 5 and circulate.

The scanner 8 is located above the photosensitive drums 5 and the toner cartridges 3C. The scanner 8 includes laser light sources, polygon mirrors, fθ lenses, and reflection mirrors. The scanner 8 may emit laser beams at the photosensitive drums 5 from above.

In the drawer 80, as the photosensitive drums 5 rotate, surfaces of the photosensitive drums 5 are charged positively and evenly by the chargers 3F, and exposed to the scanning laser beams emitted from the scanner 8. Thereby, electrostatic latent images corresponding to the images to be formed on the sheet SH are formed on the surfaces of the photosensitive drums 5.

Meanwhile, the developing rollers 3E respectively supply the toners contained in the toner containers 3G to the surfaces of the photosensitive drums 5 to form toner images. The first roller 41 and the second roller 42 convey the sheet SH toward the photosensitive drums 5, and as the sheet SH passes through the positions between the photosensitive drums 5 and the transfer belt 6, an upward surface of the sheet SH faces the photosensitive drums 5. The toner images carried on the surfaces of the photosensitive drums 5 are transferred onto the upward surface of the sheet SH.

The fuser 7 is located rearward with respect to the drawer 80. The fuser 7 includes a heat roller 7A and a pressure roller 7B, which may nip and convey the sheet S and thereby apply heat and pressure to the sheet SH, to thermally fix the toner images on the sheet SH.

The ejection roller pair 29 is located at a downstream end of an ejection path P2. The ejection path P2 is a path to guide the sheet SH exited the fuser 7 upward, turning the sheet SH upside down so that the surface on which the image is formed faces downward, and eject the sheet SH at the ejection tray 9T. The ejection roller pair 29 may nip and eject the sheet SH conveyed along the ejection path P2 at the ejection tray 9T.

First-Roller Bearings and First Roller

Figure 3:
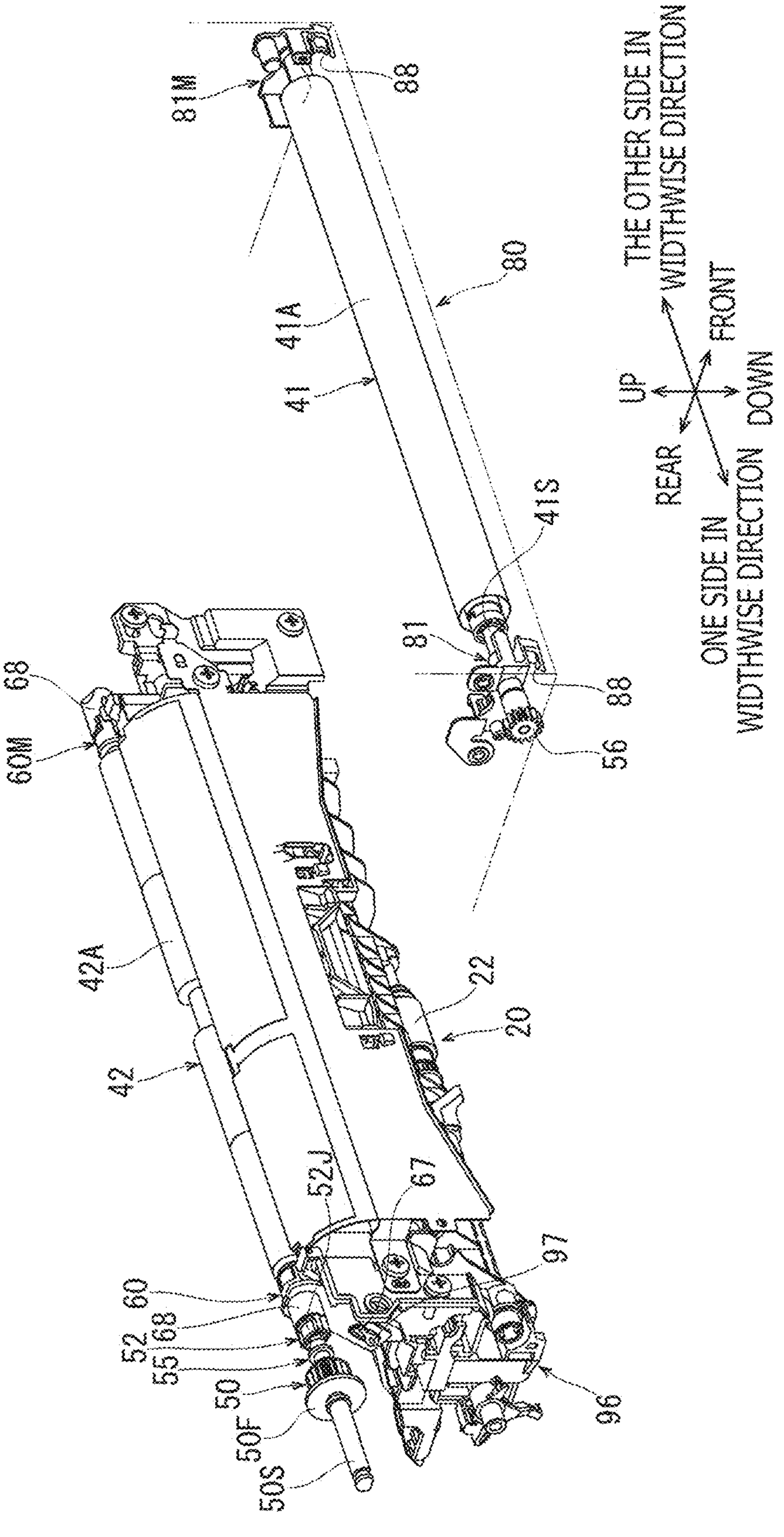
FIG. 3 is a perspective partial view of the drawer, a first roller, a transmission gear, a driving gear, a second roller, a joint shaft, a second coupling, and bearings.

As shown in FIG. 3, the drawer 80 includes first-roller bearings 81, 81M and the first roller 41.

FIG. 3 shows the drawer 80 in either the second position or the third position. The first-roller bearing 81 is located at one of lower-frontward corners in the drawer 80 on the one side in the widthwise direction. The first-roller bearing 81M is located at the other of the lower-frontward corners in the drawer 80 on the other side in the widthwise direction.

Figure 4:
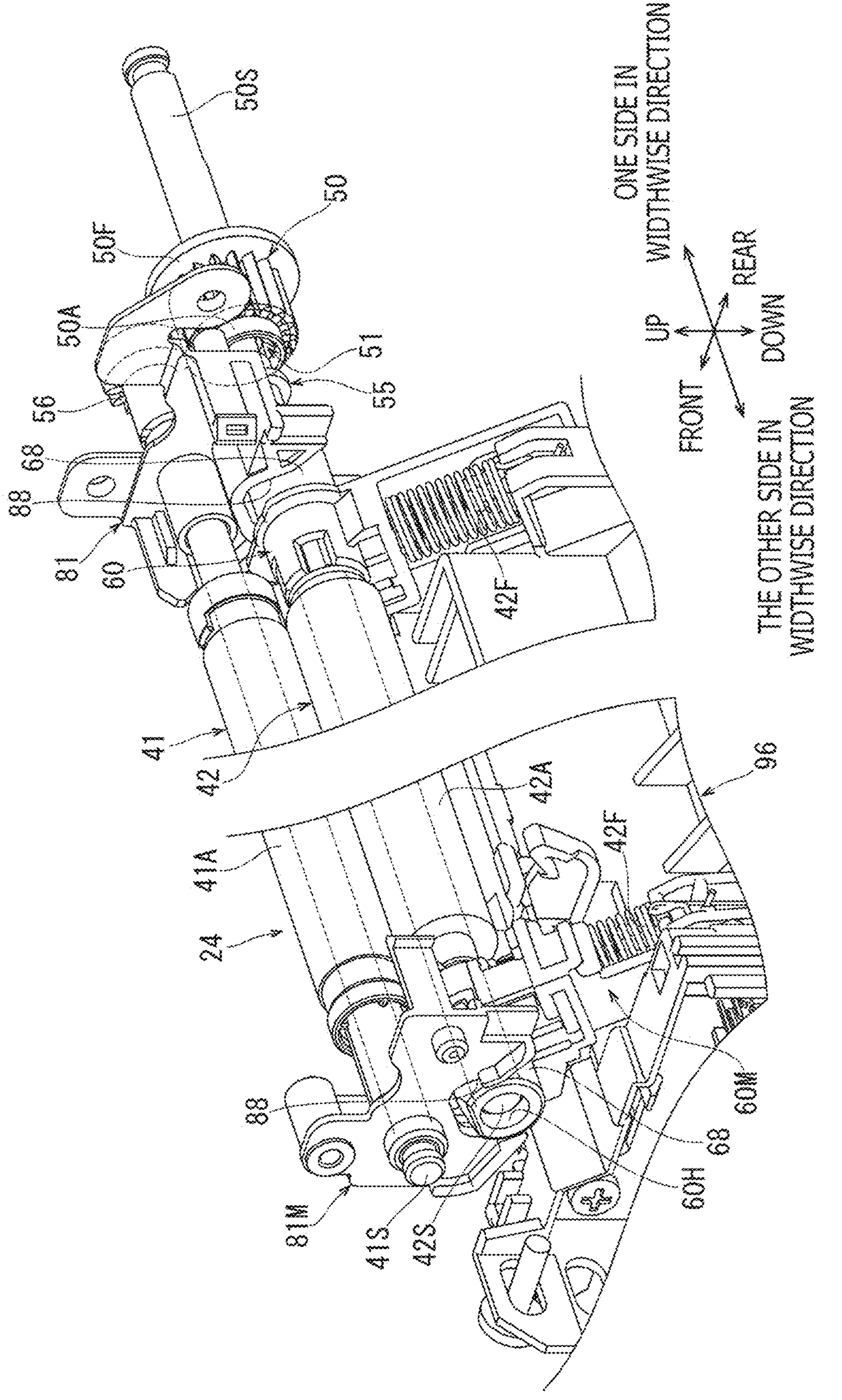
FIG. 4 is a perspective partial view of the first roller, the transmission gear, the driving gear, the second roller, the joint shaft, the second coupling, and the bearings.

In FIG. 4, while the drawer 80 is not illustrated, the positions of the first-roller bearings 81, 81M are those in the drawer 80 being located at the first position.

As shown in FIGS. 3 and 4, the first roller 41 includes a first-roller body 41A and a first-roller rotation shaft 41S.

The first-roller body 41A is in a cylindrical shape and may convey the sheet SH toward the photosensitive drums 5, when the sheet SH is in contact with the cylindrical surface of the first-roller body 41A, by rotating. The first-roller rotation shaft 41S is a metal-made cylindrical bar, which may transmit a driving force to the first-roller body 41A, and may rotate integrally with the first-roller body 41A.

The first-roller bearings 81, 81M support the first-roller rotation shaft 41S and thereby support the first roller 41 rotatably.

On the first-roller rotation shaft 41S, at a part protruding outward on the one side in the widthwise direction from the first-roller bearing 81, a transmission gear 56 is fixed. The transmission gear 56 is rotatable integrally with the first roller 41.

The first-roller bearings 81, 81M each have a positioning groove 88. The positioning grooves 88 are formed at lower-rearward positions in the first-roller bearings 81, 81M with respect to the first-roller rotation shaft 41S to recess upper-frontward toward the first-roller rotation shaft 41S.

Feeder Frame and Frame

Figure 5:
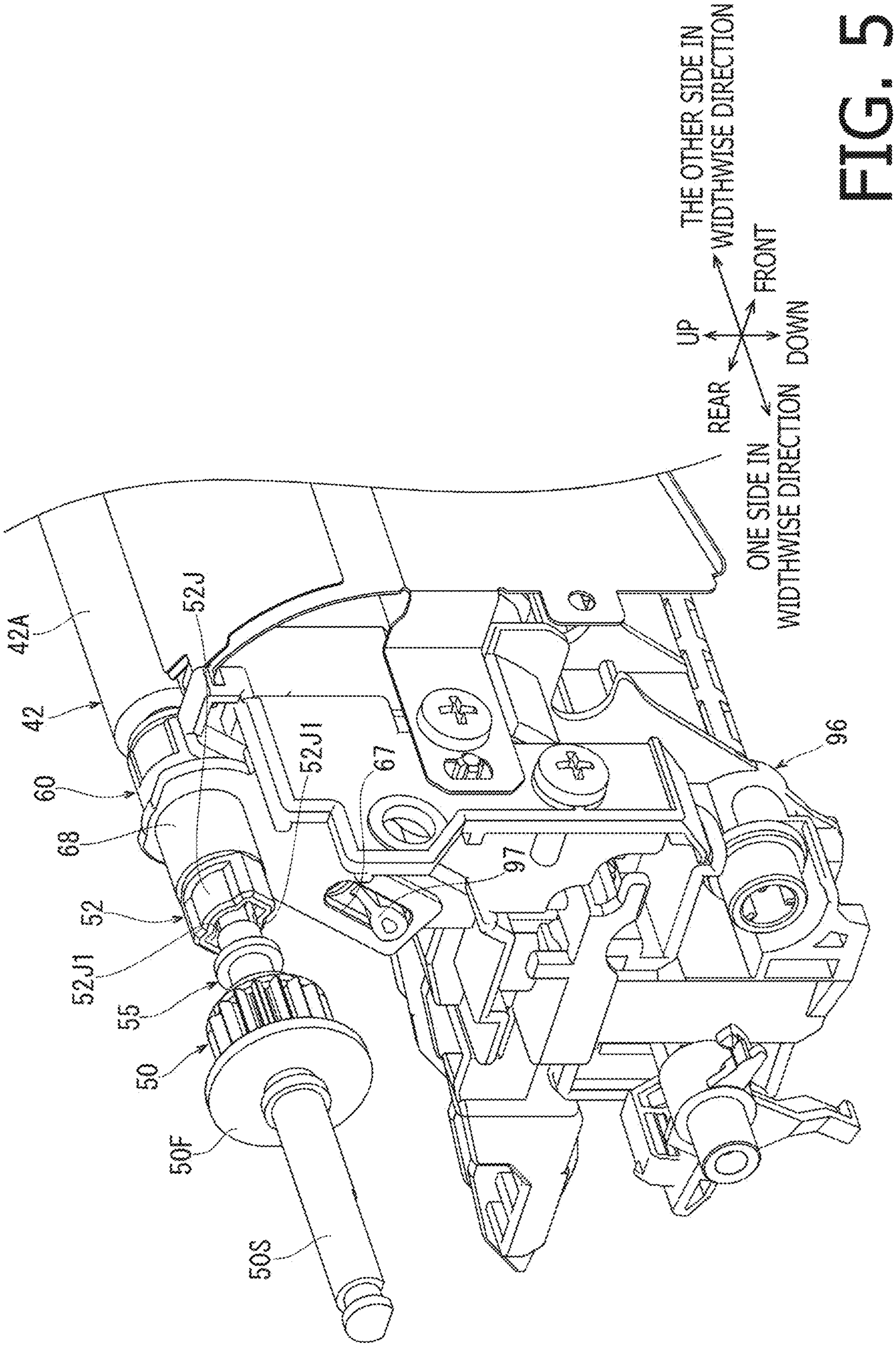
FIG. 5 is a perspective partial view of the driving gear, the second roller, the joint shaft, the second coupling, and the bearings.
Figure 6:
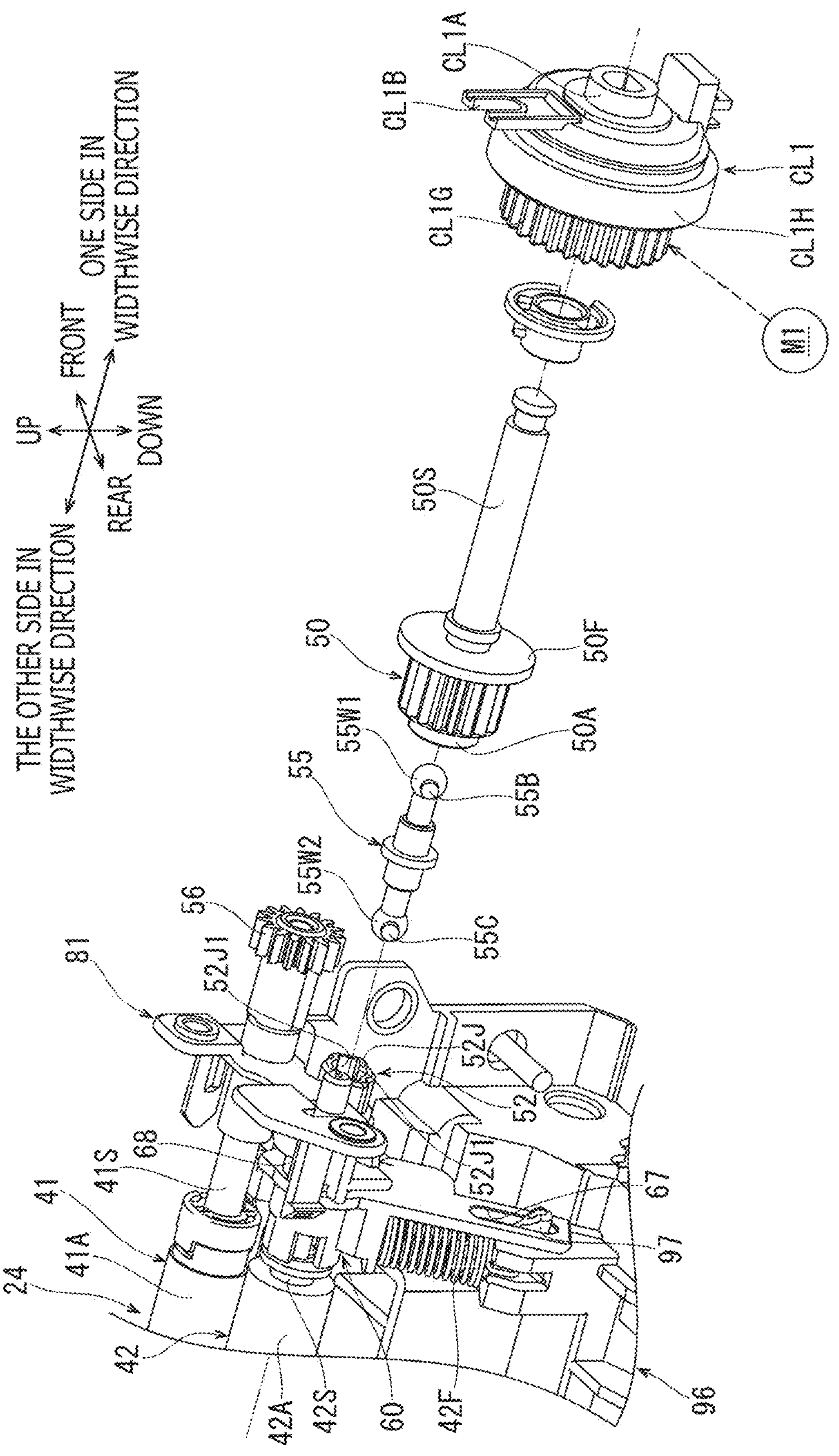
FIG. 6 is an exploded view of the first roller, the transmission gear, the driving gear, the second roller, the joint shaft, the second coupling, the bearings, and an electromagnetic clutch.
Figure 7:
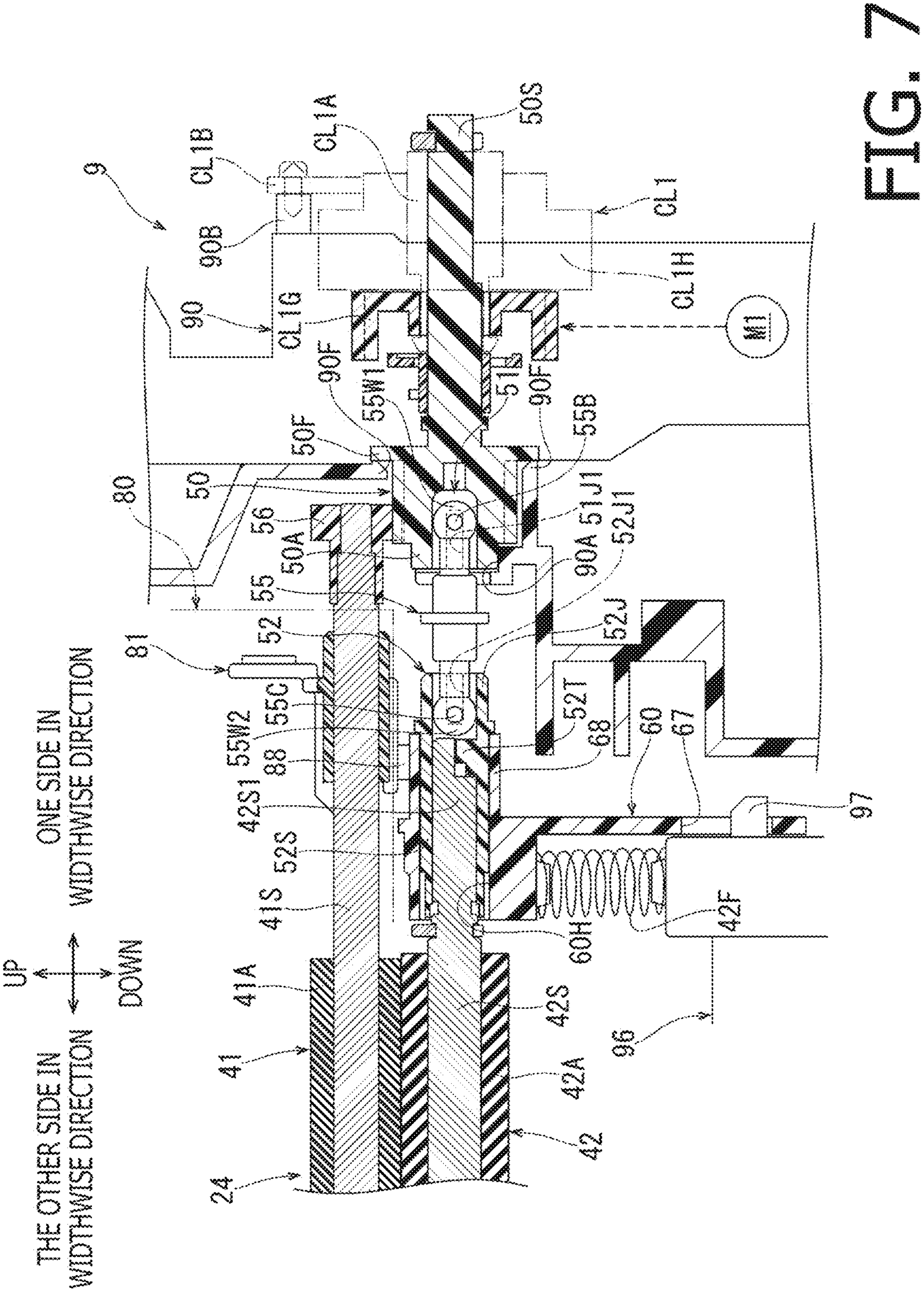
FIG. 7 is a cross-sectional view sectioned along a line A-A in FIG. 1 when the drawer is located at the first position.
Figure 8:
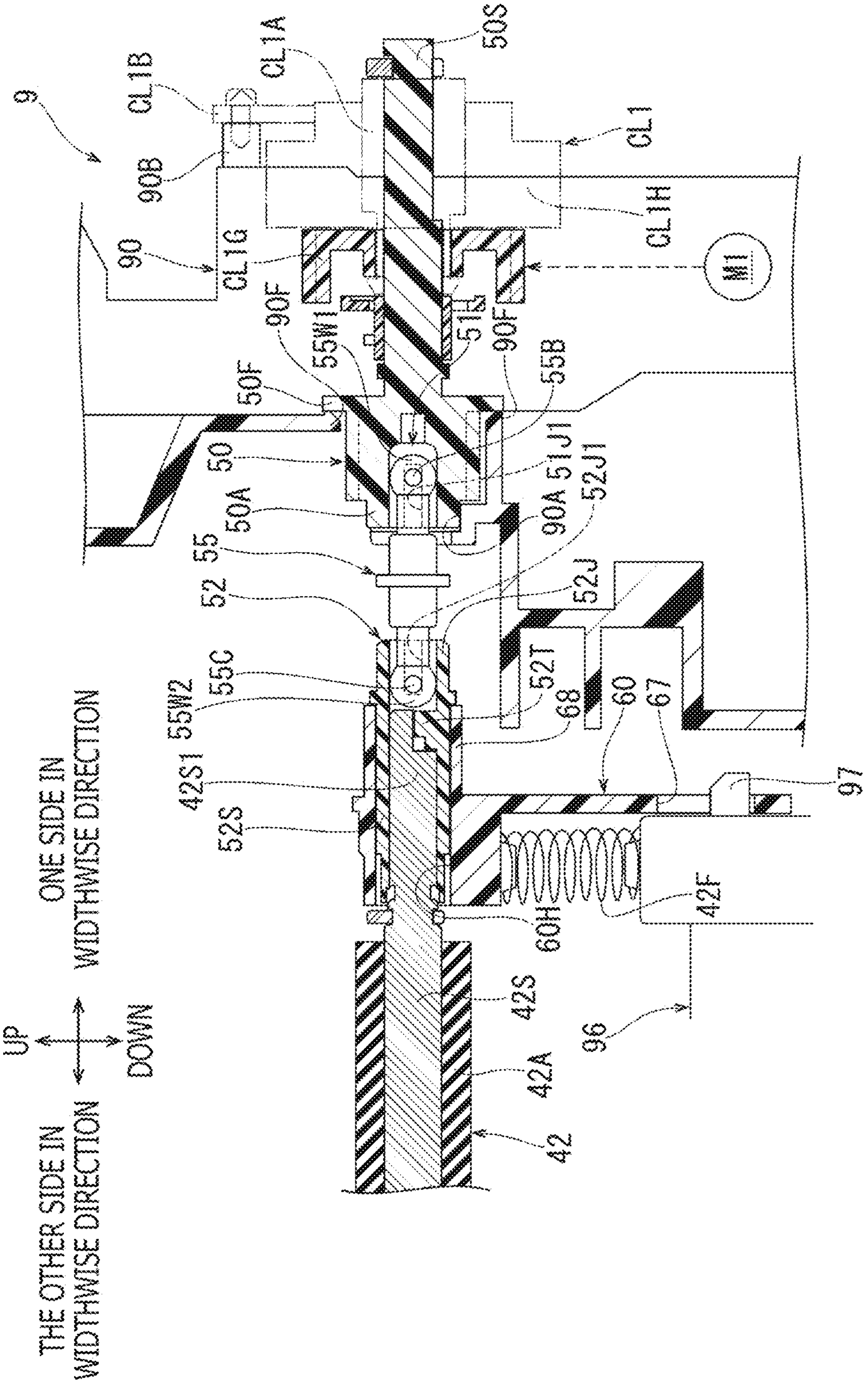
FIG. 8 is a cross-sectional view sectioned along the line A-A in FIG. 1 when the drawer is located at the third position.
Figure 9:
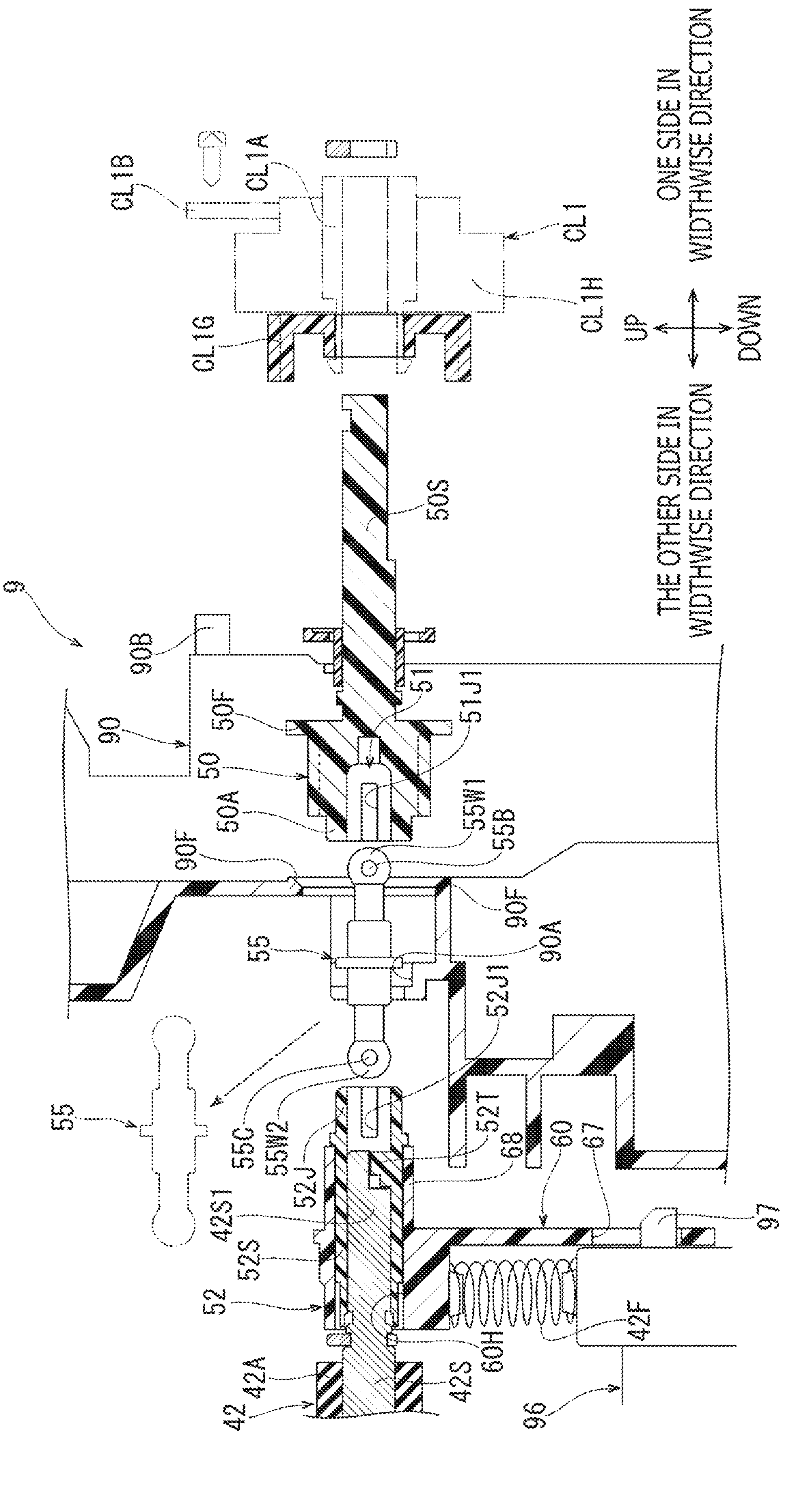
FIG. 9 is a cross-sectional view sectioned along the line A-A in FIG. 1 when removing the joint shaft.

The main body 9 incudes internal frames, including a feeder frame 96 shown in FIGS. 3-9 and a frame 90 shown in FIGS. 7-9.

As shown in FIG. 3, the feeder frame 96 extends in the widthwise direction and supports the separator roller 22 in the feeder 20 at a lower position therein.

As shown in FIG. 7, the frame 90 spreads in the front-rear direction and the up-down direction along a sideward surface of the main body 9 on the one side in the widthwise direction. Although not shown in the drawings, the feeder frame 96 is connected to the frame 90 on one end thereof on the one side in the widthwise direction.

The drawer 80 shown in FIG. 7 is located at the first position. Under the condition where the drawer 80 is located at the first position, the first-roller bearing 81 faces the frame 90 toward the one side from the other side in the widthwise direction.

The drawer 80 shown in FIG. 8 is located at the third position. Under the condition where the drawer 80 is located at the third position, a space above the feeder frame 96 and the second roller 42 is open.

Bearings, Second Roller, Compressive Coil Spring, and Second Coupling

As shown in FIGS. 6 and 7, the feeder frame 96 supports a bearing 60 at an upper position therein on a sideward end on the one side in the widthwise direction. The bearing 60 is a resin-made piece formed by injection molding of thermoplastic resin.

The bearing 60 has an elongated hole 67 formed in a lower part thereof, and the feeder frame 96 has a guiding protrusion 97, which is inserted in the elongated hole 67. With the guiding protrusion 97 inserted in the elongated hole 67, the bearing 60 is movable upper-frontward or lower-rearward.

As shown in FIG. 7, the bearing 60 has a shaft hole 60H formed there-through in the widthwise direction at an upper part thereof. Moreover, the bearing 60 has a positioning protrusion 68. The positioning protrusion 68 is in a cylindrical shape surrounding a part of the shaft hole 60H located farther from the roller body 42A in the widthwise direction.

At a position between the bearing 60 and the feeder frame 96, a compressive coil spring 42F is located. The compressive coil spring 42F urges the bearing 60 upper-frontward.

As shown in FIGS. 3 and 4, the feeder frame 96 supports a bearing 60M at an upper position therein on a sideward end on the other side in the widthwise direction. The bearing 60M is in a symmetry form to the bearing 60 and is a resin-made piece formed by injection molding of the thermoplastic resin.

The bearing 60M is, equally to the bearing 60, movable in the upper-frontward or lower-rearward.

As shown in FIG. 4, the bearing 60M has a shaft hole 60H and a positioning protrusion 68 at upper positions thereof, equally to the shaft hole 60H and the positioning protrusion 68 in the bearing 60.

At a position between the bearing 60M and the feeder frame 96, a compressive coil spring 42F is located, equally to the compressive coil spring 42F located between the bearing 60 and the feeder frame 96. The compressive coil spring 42F between the bearing 60M and the feeder frame 96 urges the bearing 60 upper-frontward.

As shown in FIGS. 4 and 7, the second roller 42 includes a roller body 42A and a rotation shaft 42S.

The roller body 42A is in a cylindrical shape and may convey the sheet SH toward the photosensitive drums 5, when the sheet SH is in contact with the cylindrical surface of the roller body 42A, by rotating. The rotation shaft 42S is a metal-made cylindrical bar, which may transmit a driving force to the roller body 42A, and may rotate integrally with the roller body 42A.

As shown in FIG. 7, an end 42S1 of the rotation shaft 42S on the one side in the widthwise direction is fitted in a second coupling 52. In other words, the second roller 42 includes the second coupling 52, which is concentric with the rotation shaft 42S of the second roller 42.

The second coupling 52 is a resin-made piece formed by injection molding of thermoplastic resin. The second coupling 52 includes a fitting portion 52S and a connecting portion 52J.

The fitting portion 52S is in a cylindrical shape, in which the rotation shaft 42S is inserted. On an inner circumference of the fitting portion 52S, a protrusion 52T is formed. The protrusion 52T engages with a part of the rotation shaft 42S on the one end 42S1 in the widthwise direction where an outer circumferential surface is cut out, and thereby the rotation shaft 42S is prevented from rotating with respect to the second coupling 52.

The bearing 60 retains the second coupling 52 at the fitting portion 52S rotatably while the fitting portion 52S is inserted in the shaft hole 60H. In other words, the bearing 60 rotatably supports the rotation shaft 42S at the one end 42S1 with the fitting portion 52S of the second coupling 52 intervening there-between.

As shown in FIGS. 5 and 7, the connecting portion 52J protrudes outward on the one side in the widthwise direction with respect to the positioning protrusion 68 of the bearing 60. The connecting portion 52J consists of a pair of grooves 52J1 extending in the widthwise direction formed on an inner circumferential surface of a recess in the second coupling 52, which recesses from an end of the second coupling 52 on the one side toward the other side in the widthwise direction.

As shown in FIG. 4, the bearing 60M supports an end of the rotation shaft 42S on the other side in the widthwise direction.

In the state where the drawer 80 is located at the first position, the bearings 60, 60M are movable to move the second roller 42 closer to or farther from the first roller 41. The compressive coil springs 42F press the bearings 60, 60M and thereby urge the second roller 42 toward the first roller 41.

Meanwhile, the positioning protrusions 68 in the bearings 60, 60M fit in the positioning grooves 88 in the first-roller bearings 81, 81M, and thereby the second roller 42 is located at a correct position with respect to the first roller 41.

When the drawer 80 moves from the first position to the second position or to the third position, the positioning protrusions 68 in the bearings 60, 60M are pressed against slanting edges of the positioning grooves 88 in the first-roller bearings 81, 81M, and thereby the bearings 60, 60M may move to separate the second roller 42 from the first roller 41. As such, the positioning protrusions 68 may exit the positioning grooves 88.

Motor, Electromagnetic Clutch, Driving Gear, and Joint Shaft

As shown in FIGS. 6 and 7, the image forming apparatus 1 includes a motor M1, an electromagnetic clutch CL1, a driving gear 50, and a joint shaft 55.

The motor M1 may operate under control of a controller, which is not shown, to generate a driving force. The driving force from the motor M1 is transmitted through a plurality of transmission devices, which are not shown, to the feeder roller 21, the separator roller 22, the conveyer roller pair 23, the ejection roller pair 29, and the image forming device 3.

Moreover, the driving force from the motor M1 is transmitted to the first roller 41 and the second roller 42, as will be described further below.

The electromagnetic clutch CL1 includes a clutch housing CL1H, an input gear CL1G, and an output portion CL1A.

As shown in FIG. 7, the frame 90 includes a boss 90B, which protrudes outward on the one side in the widthwise direction. The clutch housing CL1H includes an attachment portion CL1B and is attached to the frame 90 with the attachment portion CL1B being fastened to the boss 90B with a screw.

The input gear CL1G is rotatably supported by the clutch housing CL1H. The driving force from the motor M1 is transmitted to the input gear CL1G.

The output portion CL1A is rotatably supported by the clutch housing CL1H concentrically with the input gear CL1G. As shown in FIG. 6, the output portion CL1A has a through hole, of which cross-section is in a shape of D.

Although not shown in the drawings, the electromagnetic clutch CL1 is a friction-styled electromagnetic clutch having a coil, an armature, and a rotor inside the clutch housing CL1H. The armature is fixed to the input gear CL1G to rotate integrally with the input gear CL1G. The rotor is fixed to the output portion CL1A to rotate integrally with the output portion CL1A.

As the controller (not shown) starts supplying power to the electromagnetic clutch CL1, the coil in the electromagnetic clutch CL1 creates a magnetic field, and the armature and the rotor are magnetically attracted, and thereby the input gear CL1G and the output portion CL1A are connected.

On the other hand, when the controller stops supplying power to the electromagnetic clutch CL1, the magnetic field dissolves, and the armature and the rotor are no longer magnetically attracted, and thereby the input gear CL1G and the output portion CL1A are disconnected.

The driving gear 50 is formed integrally with a supported portion 50A, a flange 50F, a clutch shaft 50S, and a first coupling 51. In other words, the driving gear 50 includes the supported portion 50A, the flange 50F, the clutch shaft 50S, and the first coupling 51. The driving gear 50, the supported portion 50A, the flange 50F, the clutch shaft 50S, and the first coupling 51 are formed of thermoplastic resin by injection molding.

The supported portion 50A is located on a side of the driving gear 50 toward the other side in the widthwise direction. The supported portion 50A is a cylinder, of which diameter is smaller than a diameter of the driving gear 50.

The flange 50F is located on a side of the driving gear 50 toward the one side in the widthwise direction. The flange 51F is a disc, of which diameter is larger than the diameter of the driving gear 50.

The clutch shaft 50S is located on a side of the flange 50F toward the one side in the widthwise direction. The clutch shaft 50S is a cylindrical rod, of which diameter is smaller than the diameter of the supported portion 50A, and extends toward the one side in the widthwise direction.

As shown in FIG. 7, a distal part of the clutch shaft 50S on the one side in the widthwise direction has a cross-sectional shape of D. The clutch shaft 50S is inserted in the input gear CL1G of the electromagnetic clutch CL1, and the distal part having the cross-sectional shape of D is fitted in the through hole formed in the output portion CL1A.

The first coupling 51 consists of a pair of grooves 51J1 extending in the widthwise direction formed on an inner circumferential surface of a recess in the supported portion 50A, which recesses from an end of the first coupling 51 on the one side toward the other side in the widthwise direction.

In FIGS. 7-9, solely one of the pair of grooves 51J1 is shown, and the other of the pair of grooves 51J1 is omitted.

The other of the pair of grooves 51J1 is located nearer to the viewer than the one of the pair of grooves 51J1 appearing in FIGS. 7-9.

As shown in FIG. 9, the frame 90 includes a supporting portion 90A, which is located at a position apart from the connecting portion 52J of the second coupling 52 toward the one side in the widthwise direction. The supporting portion 90A is substantially larger than an outer circumferential surface of the supported portion 50A and has an inner circumferential surface in a substantially cylindrical form, and an upper part of the inner circumferential surface of the supporting portion 90A is cut off.

The frame 90 includes a flange-receivable portion 90F at a position apart from the supporting portion 90A toward the one side in the widthwise direction. The flange-receivable portion 90F is a circumferential edge of a round hole, of which diameter is larger than the outer diameter of the driving gear 50 and smaller than an outer diameter of the flange 50F.

As shown in FIG. 7, the supporting portion 90A supports the supported portion 50A rotatably, and the flange 50F contacts the flange-receivable portion 90F from the one side in the widthwise direction, and thereby, the frame 90 supports the driving gear 50 and the first coupling 51 rotatably.

As shown in FIGS. 4 and 7, when the drawer 80 is located at the first position, the transmission gear 56 meshes with the driving gear 50. On the other hand, when the drawer 80 is located at the second position or the third position, the transmission gear 56 is separated from the driving gear 50.

As shown in FIGS. 6 and 7, an axial direction of the joint shaft 55 is parallel to the widthwise direction. The joint shaft 55 consists of one end 55W1 and the other end 55W2, which are each in spherical form, in the widthwise direction, and a multileveled rod connecting the one end 55W1 and the other end 55W2. The joint shaft 55 is a resin-made piece formed by injection molding of thermoplastic resin.

The one end 55W1 of the joint shaft 55 includes a pair of cylindrical protrusions 55B. In FIGS. 6-9, solely one of the pair of cylindrical protrusions 55B is shown, and the other of the pair of the cylindrical protrusions 55B is omitted. The other of the pair of the cylindrical protrusions 55B is located farther to the viewer than the one of the pair of the cylindrical protrusions 55B appearing in FIGS. 7-9.

The other end 55W2 of the joint shaft 55 includes a pair of cylindrical protrusions 55C. In FIGS. 6-9, solely one of the pair of cylindrical protrusions 55C is shown, and the other of the pair of the cylindrical protrusions 55C is omitted. The other of the pair of the cylindrical protrusions 55C is located farther to the viewer than the one of the pair of the cylindrical protrusions 55C appearing in FIGS. 7-9.

As shown in FIG. 7, the one end 55W1 of the joint shaft 55 is inserted in the first coupling 51, and the pair of cylindrical protrusions 55B engage with the pair of grooves 51J1. Thereby, the joint shaft 55 is coupled with the first coupling 51.

The other end 55W2 of the joint shaft 55 is inserted in the connecting portion 52J of the second coupling 52, and the pair of cylindrical protrusions 55C engage with the pair of grooves 52J1. Thereby, the joint shaft 55 is coupled with the connecting portion 52J of the second coupling 52.

As such, the first coupling 51, the joint shaft 55, and the second coupling 52 in conjunction with one another form a universal joint. The joint shaft 55 may transmit the driving force from the first coupling 51 to the second coupling 52 even when the bearing 60 moves, and the rotation axis of the second coupling 52 deviates from the rotation axis of the first coupling 51.

The frame 90 supports the electromagnetic clutch CL1 at the position farther than the first coupling 51 from the joint shaft 55 in the widthwise direction, i.e., the axial direction of the joint shaft 55.

The flange 50F is in contact with the flange-receivable portion 90F of the frame 90 from the side opposite to the joint shaft 55 across the frame 90 in the widthwise direction, i.e., the axial direction of the joint shaft 55.

Transmission of Driving Force from Motor to First Roller and Second Roller

The electromagnetic clutch CL1 may switchably transmit or break the driving force from the motor M1 to the driving gear 50 and to the first coupling 51 under the control of the power to the electromagnetic clutch CL1 by the controller, which is not shown.

While the electromagnetic clutch CL1 is not powered, the electromagnetic clutch CL1 breaks the driving force, and the force may not be transmitted to the driving gear 50 or the first coupling 51 even when the motor M1 is active.

In the state where the motor M1 is active, and when the electromagnetic clutch CL1 starts being powered, the electromagnetic clutch CL1 is enabled to transmit the driving force to the driving gear 50 and the first coupling 51 through the output portion CL1A and the clutch shaft 50S. Accordingly, the driving gear 50 and the first coupling 51 are rotated by the driving force from the motor M1.

Thereby, the transmission gear 56 meshing with the driving gear 50 transmits the driving force to the first roller 41. From the driving gear 50 and the first coupling 51, the driving force is transmitted through the joint shaft 55 to the connecting portion 52J of the second coupling 52, and the fitting portion 52S of the second coupling 52 transmit the driving force to the second roller 42. Accordingly, the first roller 41 and the second roller 42 rotate.

When the power to the electromagnetic clutch CL1 stops, the electromagnetic clutch CL1 returns to the state where the electromagnetic clutch CL1 breaks the driving force.

Removal of Joint Shaft and Second Roller

When the second roller 42, having been used for a long term and worn out, for example, is to be replaced with another second roller 42, the joint shaft 55 and the second roller 42 may be removed in a procedure described below.

The second roller 42, the second coupling 52, and the joint shaft 55 are covered with the drawer 80 in the state where the drawer 80 is located at the first position as shown in FIG. 7 and in the state where the drawer 80 is located at the second position as shown in FIG. 2.

The arrangement "the second roller 42, the second coupling 52, and the joint shaft 55 are covered with the drawer 80" may include not only the condition where the drawer 80 is located above the second roller 42, the second coupling 52, and the joint shaft 55 but also a condition where the second roller 42, the second coupling 52, and the joint shaft 55 may not be reached by the user or the maintenance worker. In particular, the drawer 80 at the first position is located above the second roller 42, the second coupling 52, and the joint shaft 55; therefore, the worker, for example, standing in front of the image forming apparatus 1 may neither visually recognize nor touch the second roller 42, the second coupling 52, or the joint shaft 55, as the drawer 80 located at the second position blocks the sight of the worker.

On the other hand, in the state where the drawer 80 is located at the third position, as shown in FIG. 8, the second roller 42, the second coupling 52, and the joint shaft 55 are exposed. In other words, the drawer 80 is moved to the outside of the main body 9; therefore, a space above the second roller 42, the second coupling 52, and the joint shaft 55 is open. In this arrangement, the worker standing in front of the image forming apparatus 1 may access the second roller 42, the second coupling 52, and the joint shaft 55 through the opening 9H.

Under this condition, the worker may remove an exterior cover, which is not shown in the drawings but covers the frame 90 of the main body 9 from the one side in the widthwise direction. Further, the worker may remove the screw that fastens the attachment portion CL1B of the clutch housing CL1H to the frame 90 from the boss 90B.

Next, the worker may move the electromagnetic clutch CL1 toward the one side in the widthwise direction and remove the input gear CL1G and the output portion CL1A from the clutch shaft 50S.

Next, the worker may move the driving gear 50, the supported portion 50A, the flange 50F, the clutch shaft 50S, and the first coupling 51 toward the one side in the widthwise direction, separate the supported portion 50A from the supporting portion 90A of the frame 90, and separate the flange 50F from the flange-receivable portion 90F.

As such, the one end 55W1 of the joint shaft 55 may be detached from the first coupling 51. Moreover, the worker may reach his/her hand inside the main body 9 through the opening 9H, pinch the joint shaft 55, and move the joint shaft 55 toward the one side in the widthwise direction. Thereby, the other end 55W2 of the joint shaft 55 may be detached from the connecting portion 52J of the second coupling 52, and the joint shaft 55 may be removed from the main body 9. Accordingly, the bearing 60 is enabled to move toward the one side in the widthwise direction.

Lastly, the worker may move the bearing 60 toward the one side in the widthwise direction to remove from the feeder frame 96 and withdraw the rotation shaft 42S from the shaft holes 60H of the bearings 60, 60M. Thereby, the second roller 42 is enabled to be removed.

Effects

The image forming apparatus 1 according to the embodiment described above is, as shown in FIG. 7, not provided with the first idle gear, the second idle gear, or the first gear, which are provided to the known image forming apparatus mentioned earlier. Instead, the image forming apparatus 1 is, between the driving gear 50 and the first roller 41, provided merely with the transmission gear 56. Moreover, between the driving gear 50 and the second coupling 52 in the second roller 42, the image forming apparatus 1 is provided with the first coupling 51 and the joint shaft 55, where the first coupling 51, the joint shaft 55, and the second coupling 52 form the universal joint.

In this arrangement in the image forming apparatus 1, the second roller 42 and the joint shaft 55 align concentrically. Accordingly, the joint shaft 55 located concentrically with the second roller 42 may be reached by the maintenance worker easily.

In particular, the second roller 42 is a roller to convey the sheet SH and is therefore located at the position accessible to the user to, for example, remove a jammed sheet SH easily. In this regard, the image forming apparatus 1 according to the embodiment is not provided with the first idle gear, the second idle gear, or the first idle gear provided to the known image forming apparatus but is provided between the driving gear 50 and the first roller 41 with the transmission gear 56 alone, and between the driving gear 50 and the second coupling 52 in the second roller 42, the image forming apparatus 1 is provided merely with the first coupling 51 and the joint shaft 55, where the first coupling 51, the joint shaft 55, and the second coupling 52 form the universal joint. In other words, compared to the known image forming apparatus, a quantity of idle gears may be reduced, and compared to the known mechanism, in which the joint shaft is located to be lower than the roller and farther from a user, the joint shaft 55 is located closer to the user. Accordingly, the user or the maintenance worker may reach the joint shaft 55 located concentrically with the second roller 42 easily.

As described earlier, the joint shaft 55 may move along with the bearing 60 such that the position of the rotation axis of the second coupling 52 deviates from the rotation axis of the first coupling 51. In this regard, the concentrical arrangement between the joint shaft 55 and the second roller 42 includes not only the arrangement, in which the rotation axis of the second roller 42 coincides completely with the rotation axis of the joint shaft 55, but also an arrangement, in which the position of the rotation axis of the second coupling 52 deviates from the rotation axis of the first coupling 51 due to the movement of the bearing 60.

According to this arrangement, the image forming apparatus 1 in the embodiment of the present disclosure enables easy removal of the joint shaft 55 and the second roller 42.

Moreover, the image forming apparatus 1 is not provided with the first idle gear, the second idle gear, and the first gear that are provided to the known image forming apparatus. Therefore, a quantity of parts and devices to form the image forming apparatus 1 may be reduced.

Moreover, in the image forming apparatus 1, the bearing 60 retains the second coupling 52 by the fitting portion 52S, in which the rotation shaft 42S of the second roller 42 is inserted. Therefore, compared to a configuration, in which, for example, the bearing 60 supports the second roller 42 by the rotation shaft 42S, and the second coupling 52 is fixed to the rotation shaft 42S at a position apart from the bearing 60 toward the one side in the widthwise direction, the image forming apparatus 1 may be downsized in the widthwise direction. Moreover, the rotation shaft 42S is formed of metal, and the second coupling 52 and the bearing 60 are made of resin. Therefore, abrasion between the second coupling 52 and the bearing 60 may be reduced.

Moreover, in the image forming apparatus 1, the frame 90 supports the first coupling 51 rotatably and supports the electromagnetic clutch CL1 at the position apart farther from the joint shaft 55 than the first coupling 51 in the widthwise direction, i.e., the axial direction of the joint shaft 55. The first coupling 51 includes the clutch shaft 50S, which is inserted in the output portion CL11A of the electromagnetic clutch CL1, and the flange 51F, which contacts the flange-receivable portion 90F of the frame 90 from the side of the frame 90 opposite to the joint shaft 55 in the widthwise direction, i.e., the axial direction of the joint shaft 55, integrally. In this arrangement, as shown in FIG. 9, by removing the electromagnetic clutch CL1 from the frame 90, detaching the input gear CL1G and the output portion CL1A of the electromagnetic clutch CL1 from the clutch shaft 50S, and separating the first coupling 51 from the joint shaft 55 toward the one side in the widthwise direction, the maintenance worker may remove the joint shaft 55 and the second roller 42 easily.

Moreover, in the image forming apparatus 1, as shown in FIG. 4, the bearing 60 includes the positioning protrusion 68, and the drawer 80 includes the positioning groove 88, in which the positioning protrusion 68 may be inserted when the drawer 80 is located at the first position. In contrast, in the known image forming apparatus, for example, disclosed in U.S. Patent Application Publication No. 2022/0026842, as shown in FIGS. 1 and 2, the drawer includes the photosensitive drums and the first roller, and the main body accommodates the drawer movably, and as shown in FIG. 8, the second gear is located on the side of the gear holder opposite to the second roller in the axial direction. To the gear holder, a second gear cover to cover the second gear is provided. The second gear cover has a cylindrical positioning protrusion on an outer side of the second gear opposite to the second roller. Moreover, the drawer in the known image forming apparatus has, as shown in FIG. 7, a positioning groove, in which the cylindrical positioning protrusion may be inserted when the drawer is accommodated in the main body. In this respect, compared to the known image forming apparatus, in the image forming apparatus 1 in the present embodiment, formation of the positioning protrusion 68 and its neighboring components may be simplified, and the positioning protrusion 68 and its neighboring components may be downsized.

Moreover, in the image forming apparatus 1, the second roller 42, the second coupling 52, and the joint shaft 55 are covered with the drawer 80 when the drawer 80 is located at the first position as shown in FIG. 7 and in the second position as shown in FIG. 2 but are exposed when the drawer 80 is located as the third position as shown in FIG. 8. In this arrangement, by locating the drawer 80 at the third position, the maintenance worker may remove the joint shaft 55 and the second roller 42 easily.

Moreover, according to the image forming apparatus 1 in the present embodiment, the first roller 41 and the second roller 42 form the registration roller pair 24, which may be in contact with the leading edge of the sheet SH conveyed thereto while the first roller 41 and the second roller 42 pause and may start rotating after a predetermined length of time from the contact to convey the sheet SH toward the photosensitive drums 5. In this respect, in the image forming apparatus 1 in the present embodiment, the configuration to drive the first roller 41 and the second roller 42, which may regulate skewing of the sheet S, may be simplified and downsized.

While the invention has been described in conjunction with various example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, the present disclosure may not necessarily be embodied by the image forming apparatus 1 described above but may be applied to a multifunction peripheral machine, which includes the image forming apparatus and an image reading apparatus arranged on an upper side of the image forming apparatus.

For another example, the driving gear 50 and the first coupling 51 may not necessarily be formed integrally, but the first coupling may be formed separately and assembled with the driving gear.

For another example, the bearing 60 may not necessarily retain the part of the second coupling 52, i.e., the fitting portion 52S, where the rotation shaft 42S is inserted. For example, the bearing may retain the rotation shaft of the second roller rotatably, and the second coupling may be fixed to a part of the second roller protruding outward from the bearing.

For another example, the image forming apparatus 1 may not necessarily be equipped with the image forming device which includes the drawer 80, the transfer belt 6, the scanner 8, and the fuser 7 for forming multicolor images electrophotographically in the direct-transfer style. For example, the present disclosure may be applied to an image forming apparatus equipped with an image forming device which includes an intermediate transfer belt and a secondary-transfer roller for forming multicolor images electro-photographically in an indirect-transfer style. In such an arrangement, rollers that may convey the sheet SH to a nipping position between the intermediate transfer belt and the secondary-transfer roller may function as the first roller and the second roller in the present disclosure. Moreover, the present disclosure may not necessarily be applied to a multicolor electro-photographic image forming apparatus but may be applied to a monochrome electro-photographic image forming apparatus. Furthermore, the present disclosure may be applied to a printer with an inkjet head as the image forming device, i.e., an inkjet-styled image forming apparatus. In this arrangement, rollers to convey the sheet SH to a position, at which the sheet SH faces the inkjet head, may function as the first roller and the second roller.

What is claimed is:

1. An image forming apparatus, comprising:

an image forming device configured to form an image on a sheet;

a motor configured to generate a driving force;

a driving gear including a first coupling, the driving gear being rotatable by the driving force from the motor;

a first roller configured to convey the sheet toward the image forming device;

a transmission gear meshed with the driving gear, the transmission gear being rotatable integrally with the first roller;

a second roller configured to nip the sheet in conjunction with the first roller and rotate to convey the sheet toward the image forming device;

an urging member urging the second roller toward the first roller; and a joint shaft connected to the first coupling at one end thereof in an axial direction, wherein the second roller includes a second coupling arranged concentrically with a rotation shaft of the second roller, the second coupling being configured to transmit the driving force from the driving gear to the second roller, the second coupling being connected with the other end of the joint shaft in the axial direction, the second coupling in conjunction with the first coupling and the joint shaft forming a universal joint.

2. The image forming apparatus according to claim 1, further comprising a bearing, the bearing retaining the second coupling rotatably, wherein the second roller includes a roller body to convey the sheet and the rotation shaft rotatable integrally with the roller body, one end of the rotation shaft being inserted in the second coupling, the bearing retains a part of the second coupling, in which the rotation shaft of the second roller is inserted, and is movable to move the second roller closer to or farther from the first roller, and the urging member urges the bearing.

3. The image forming apparatus according to claim 2, wherein the urging member includes a spring, the spring being configured to urge the bearing.

4. The image forming apparatus according to claim 1, further comprising:

an electromagnetic clutch configured to switchably transmit or break the driving force from the motor to the first coupling; and a frame supporting the first coupling rotatably, the frame supporting the electromagnetic clutch at a position farther than the first coupling from the joint shaft in the axial direction, wherein the first coupling includes a clutch shaft inserted in the electromagnetic clutch and a flange being in contact with the frame from a side of the frame opposite to the joint shaft in the axial direction.

5. The image forming apparatus according to claim 1, wherein the image forming device includes a photosensitive drum, the photosensitive drum being rotatable about an axis extending in the axial direction, and the first roller and the second roller are configured to convey the sheet toward the photosensitive drum.

6. The image forming apparatus according to claim 5, further comprising:

a bearing retaining the second coupling rotatably;

a drawer including the photosensitive drum and the first roller; and a main body configured to accommodate the drawer at a first position, the main body supporting the drawer movably from the first position, wherein the second roller includes a roller body to convey the sheet and the rotation shaft rotatable integrally with the roller body, one end of the rotation shaft being inserted in the second coupling, wherein the bearing retains a part of the second coupling, in which the rotation shaft of the second roller is inserted, and is movable to move the second roller closer to or farther from the first roller, wherein the urging member urges the bearing, wherein the bearing includes a positioning protrusion locating the second roller at a correct position with respect to the first roller in a state where the drawer is located at the first position, and wherein the drawer includes a positioning groove, in which, in the state where the drawer is located at the first position, the positioning protrusion fits.

7. The image forming apparatus according to claim 6, wherein the drawer is loadable with a toner cartridge storing toner, the drawer is movable among the first position, a second position at which the drawer is drawn from the first position outward from the main body and at which the toner cartridge is replaceable, and a third position at which the drawer is drawn further outward from the second position and at which the drawer is detached from the main body, and the second roller, the second coupling, and the joint shaft are covered with the drawer in the state where the drawer is located at the first position and in a state where the drawer is located at the second position and are exposed in a state where the drawer is located at the third position.

8. The image forming apparatus according to claim 1, wherein the first roller and the second roller form a registration roller pair, the registration roller pair being configured to be in contact with a leading edge of the sheet conveyed to the first roller and the second roller while the first roller and the second roller pause and start rotating after a predetermined length of time from the contact to convey the sheet toward the image forming device.

* * * * *